(12) United States Patent
Belinky et al.

(10) Patent No.: US 8,011,685 B2
(45) Date of Patent: Sep. 6, 2011

(54) INTERCHANGEABLE HITCH BALL ASSEMBLY

(75) Inventors: Jack Belinky, Carleton, MI (US); Neal Weipert, Livonia, MI (US)

(73) Assignee: Cequent Towing Products, Inc., Plymouth, MI (US)

( * ) Notice: Subject to any disclaimer, the term of this patent is extended or adjusted under 35 U.S.C. 154(b) by 23 days.

(21) Appl. No.: 12/384,598

(22) Filed: Apr. 7, 2009

(65) Prior Publication Data

US 2009/0267323 A1 Oct. 29, 2009

Related U.S. Application Data

(60) Provisional application No. 61/123,255, filed on Apr. 7, 2008.

(51) Int. Cl.
*B60D 1/06* (2006.01)
(52) U.S. Cl. ........ 280/511; 280/507; 280/515; 280/508; 280/491.5
(58) Field of Classification Search ................. 280/511, 280/507, 515, 508, 491.5
See application file for complete search history.

(56) References Cited

U.S. PATENT DOCUMENTS

| | | | | |
|---|---|---|---|---|
| 4,201,400 A * | 5/1980 | Hoogenbosch | ............... | 280/511 |
| 4,522,421 A * | 6/1985 | Vance | ............... | 280/511 |
| 5,280,941 A * | 1/1994 | Guhlin | ............... | 280/507 |
| 5,741,022 A * | 4/1998 | Wass et al. | ............... | 280/507 |
| 6,139,043 A | 10/2000 | Gries et al. | | |
| 6,616,168 B2 | 9/2003 | Belinky | | |
| 6,783,144 B2 | 8/2004 | McCoy et al. | | |
| 6,983,950 B2 | 1/2006 | McCoy et al. | | |
| 7,413,212 B2 * | 8/2008 | Hsai | ............... | 280/507 |
| 7,690,673 B1 * | 4/2010 | Kraai | ............... | 280/507 |
| 2005/0104326 A1 * | 5/2005 | Hord et al. | ............... | 280/511 |

* cited by examiner

*Primary Examiner* — Paul N Dickson
*Assistant Examiner* — Marlon A Arce
(74) *Attorney, Agent, or Firm* — McDonald Hopkins LLC

(57) ABSTRACT

An interchangeable hitch ball assembly that may be easily interchangeable with the hitch of a towing vehicle and that may prevent a trailer socket from being connected to the hitch ball prior to securing the hitch ball to the hitch bar. The hitch ball assembly may include a ball member, a body, a passageway, at least one locking member, an elongated member located within the passageway and biased toward the at least one locking member, and a plunger capable of being moved by the elongated member between a locked position and an unlocked or release position. The plunger may be moved toward the locking member to force at least a portion of the locking member outside of the body to lock the assembly. The plunger may be moved away from the locking member to allow the locking member to retreat into the body and unlock the assembly.

20 Claims, 5 Drawing Sheets

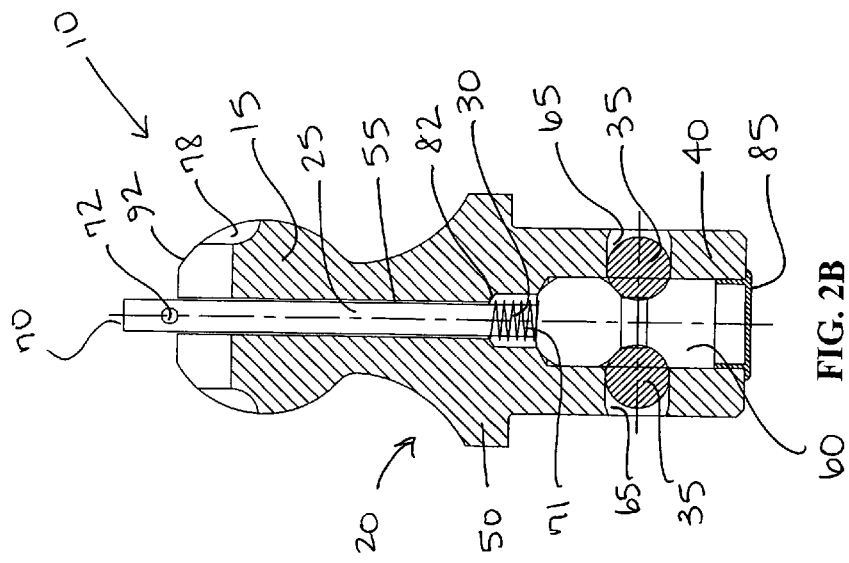

INTERCHANGEABLE HITCH BALL ASSEMBLY

CROSS-REFERENCE TO RELATED APPLICATIONS

This application claims benefit from U.S. Provisional Patent Application No. 61/123,255, entitled "Interchangeable Hitch Ball Assembly," filed on Apr. 7, 2008, which is hereby incorporated in its entirety by reference.

FIELD OF THE INVENTION

The present invention relates generally to a towing assembly and, more specifically, to an interchangeable hitch ball assembly.

BACKGROUND

Many vehicles are designed to transport freight, goods, merchandise, personal property, and other such cargo. Often, such vehicles are arranged to tow a trailer by attaching the trailer to the towing vehicle, such as through the use of a hitch assembly. Typically, a trailer hitch is utilized to connect a towed vehicle or trailer to a towing vehicle, such as a truck, for example.

There are many different types of trailer hitches in the art that may be attached to the towing vehicle in a variety of ways, depending on the type of hitch. Some of the most common types of hitches include gooseneck, fifth wheel, front mount, and the like. Typically, trailers are connected to a towing vehicle by way of a hitch assembly including a ball hitch or member secured to the towing vehicle and a ball socket coupling mechanism on the towed vehicle or trailer that mounts over the ball and thereby allows for the trailer to pivot behind the towing vehicle.

Ball and socket-type towing mechanisms are used on a wide variety of vehicles, such as automobiles, SUVs, trucks, tractors, and the like. The systems are used to tow various vehicles, such as trailers, mobile homes, other non-operating vehicles, and the like. The socket to hitch ball connection allows relative movement between the towing vehicle and the trailer as the towing vehicle makes turns, traverses uneven or rough terrain, and passes along inclining and declining roadways.

The hitch ball or member of some hitches, such as gooseneck and fifth wheel, for example, is commonly mounted in the bed of a towing vehicle, such as a pickup truck, near the longitudinal centerline of the bed, so that the weight of the trailer is evenly distributed between the tires on the two sides of the pickup truck. Typically, a sub-frame assembly, such as a hitch, is secured to the towing vehicle. The ball member is attached or otherwise secured to the hitch for use in towing the towed vehicle.

This type of hitch is often secured to the truck structure in an opening cut in the bed of the truck, so that a substantial portion of the hitch attachment is located below the bed of the truck. In addition, the ball member typically may be removed or lowered to a stowed position below the bed to ensure that the use of the bed is not substantially hindered by the presence of the ball.

The socket structure of a coupler mechanism is typically affixed to the trailer or towed vehicle. Generally, the coupler is secured to the tongue of the vehicle or trailer, usually a forward extension of the frame. The coupler typically includes a manually operated clamping arrangement which retains the ball member in the socket and thus the towed trailer or vehicle to the towing vehicle.

Often, the trailers and sockets are of different sizes, requiring ball members of different sizes. Also, in some instances, it is preferable to be able to remove the ball member for security purposes in order to protect it from corrosion, or to simply store it when it is not being used.

Hitch assemblies of various sizes have been used for this purpose. As a result, it is not uncommon for different types of trailers to be equipped with sockets that may be adapted for use with hitch balls of different sizes or diameters. Therefore, attempts have been made to provide interchangeable hitch balls to allow the towing vehicle to accommodate a variety of different trailer sockets on the towed vehicle. However, such attempts suffer from several deficiencies.

For example, such hitch balls are typically provided with a threaded mounting shank that is inserted through an aperture in a hitch bar on the towing vehicle. The hitch ball is secured to the hitch bar with a nut and locking washer. This typically requires significant user inconvenience as the user may need to stoop or lay on the ground to secure or remove the hitch ball from the hitch bar. This can be a particularly frustrating problem if the ground is wet or muddy. Further, such hitch balls do not prevent a trailer socket from being coupled to the hitch ball prior to securing the hitch ball to the hitch bar.

Over the years, towing balls of various diameters have been used and several industry standard sizes (e.g., 1⅞ inch, 2 inch, 2¼ inch and 2 5/16 inch in diameter) are now in frequent use. As a result, it is not uncommon for a single towing vehicle to be used to tow various trailers where those trailers are equipped with socket assemblies adapted for operative connection with towing balls of different diameters. Thus, there is a need in the art for a hitch ball assembly that allows for an easy and convenient interchange of towing balls of different diameters, thereby permitting the hitch of the towing vehicle to be tailored to fit the socket assembly of the towed vehicle or trailer and thereby meet the application needs.

Toward this end, a number of approaches have been proposed in the past. Some approaches have included using a post for a towing ball incorporating a spring-biased latch pin for releasably attaching the towing ball to the base. Others utilize a post and towing ball secured together by means of a fastening pin. While other approaches utilize an interchangeable hitch ball assembly including a post having an annular groove. The towing ball is secured to the post by means of an offset pin which extends tangentially through the annular groove so as to allow relative rotation of the towing ball on the post.

While these approaches may provide a secure connection of the towing ball to the post, the latch pins may prevent rotation of the towing ball relative to the post. Such rotation is desirable as it minimizes binding forces and promotes articulation and smooth trailer tracking at both highway speeds and when maneuvering slowly in confined areas. There, however, is some difficulty in effectively securing the pin in position and the structures may be relatively expensive to produce.

Therefore, there is a need in the art for an improved hitch ball assembly that may be easily interchangeable with the hitch of the towing vehicle. Further, there is a need for a hitch ball assembly that prevents a trailer socket from being connected to the hitch ball prior to securing the hitch ball to the hitch bar.

DESCRIPTION OF THE DRAWINGS

Objects and advantages together with the operation of the embodiments may be better understood by reference to the following detailed description taken in connection with the following illustrations, wherein:

FIG. 2A illustrates a cross-sectional side view of an embodiment of a hitch ball assembly in a locked position.

FIG. 2B illustrates a cross-sectional side view of the hitch ball assembly of FIG. 2A in an unlocked position.

FIG. 2C illustrates a top view of the hitch ball assembly of FIG. 2A in a locked position.

SUMMARY OF THE INVENTION

An interchangeable hitch ball assembly may include a ball member, a body, a passageway, and a plunger. The body may be connected to the ball member. The passageway may be located in the hitch ball assembly. There may also be at least one locking member in communication with the passageway, and an elongated member located within the passageway. The elongated member may be biased toward the at least one locking member. The plunger may be capable of being moved by the elongated member between a locked position where the plunger may be moved toward the at least one locking member to force at least a portion of the at least one locking member outside of the body, and a released or unlocked position where the plunger may be moved away from the at least one locking member to allow the at least one locking member to retreat into the body.

An interchangeable hitch ball assembly may include a body, a ball member, a locking element, a biasing member, and a plunger. The ball member may be carried on the body. The at least one locking element may be contained with the body. The body may also include an elongated member positioned within the body. The elongated member may have a first end connected to a head and a second end connected to a plunger. The biasing member may be configured to bias the plunger towards the at least one locking member to force the at least a portion of the at least one locking member outside of the body. The plunger may be capable of being moved away from the at least one locking member to allow the at least one locking member to retreat into the body

DETAILED DESCRIPTION

FIGS. 1A-4C illustrate embodiments of an interchangeable hitch ball assembly 10 ("assembly 10"). The assembly 10 may combine the function and benefits of a typical hitch ball assemblies into an improved hitch ball assembly. The hitch ball assembly 10 may also prevent a trailer socket (not shown) from being connected to the hitch ball member prior to securing the hitch ball to the hitch bar.

Figure 1B:
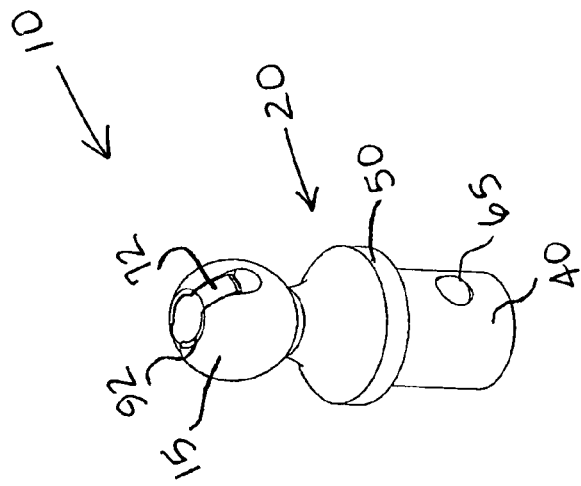
FIG. 1B illustrates a perspective view of the hitch ball assembly of FIG. 1A in a locked position.
Figure 1A:
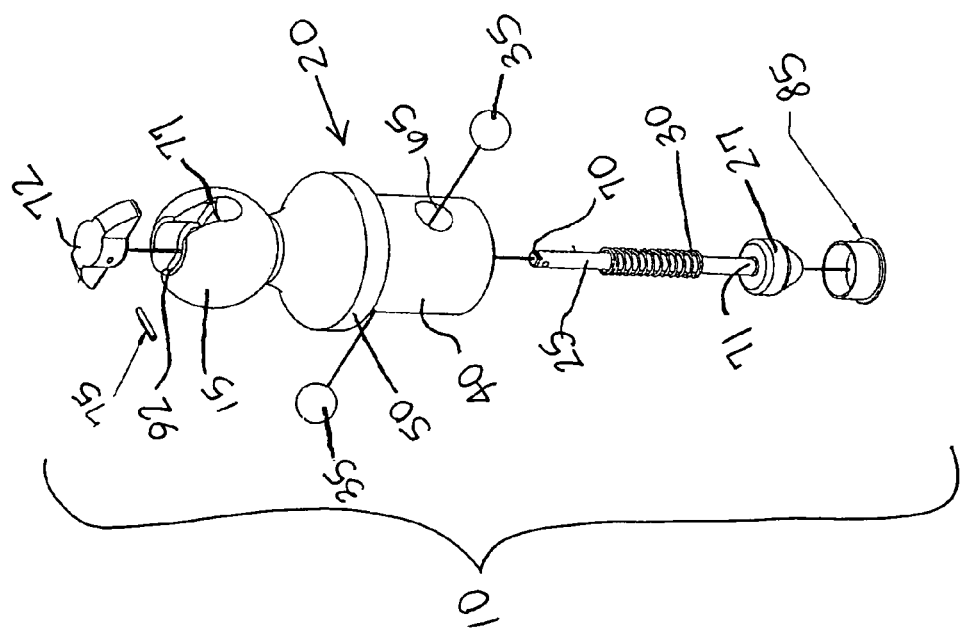
FIG. 1A illustrates an exploded view of an embodiment of a hitch ball assembly.
Figure 1E:
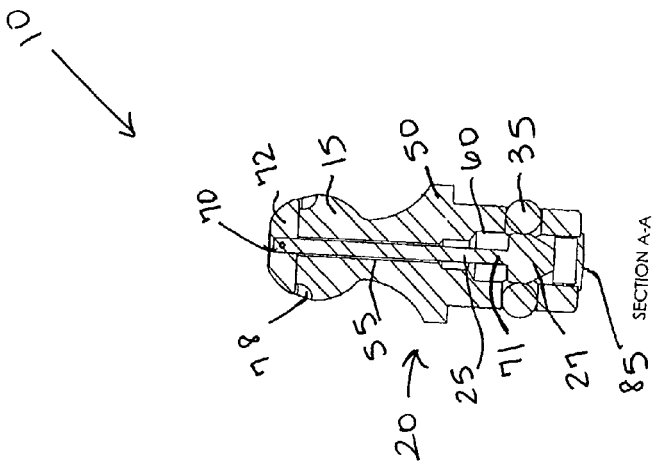
FIG. 1E illustrates a cross-sectional side view of the hitch ball assembly of FIG. 1B taken along section A-A.
Figure 1D:
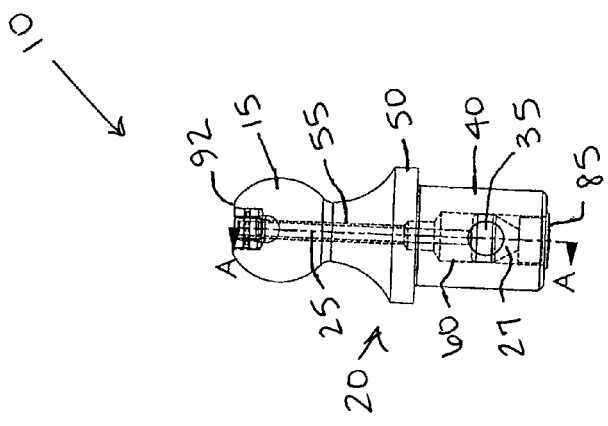
FIG. 1D illustrates a front view of the hitch ball assembly of FIG. 1B.

As shown in FIGS. 1A and 1B, the assembly 10 may include a ball member 15 and a body 20. The ball member 15 may be shaped to receive a corresponding socket (not shown) of a trailer to be towed. It is to be understood that the ball member 15 may be of any appropriate or conventional shape and size in the towing field. The ball member 15 may also be a separate piece from the body 20 or may be integrally formed with the body 20. If the ball member 15 and body 20 are separate pieces, they may be secured together by any appropriate means, such as by fasteners, adhesives or the like. As shown in FIG. 2A, an interchangeable hitch ball assembly 10 may be removably secured to a hitch receiver 37 on an automobile, truck, SUV, or other vehicle.

The body 20 may include an insert portion 40. The insert portion 40 may be of any appropriate shape or size, such as being shaped for insertion into the hitch receiver 37, as shown in FIG. 2A. Although illustrated as substantially cylindrical in shape, it is to be understood that the insert portion 40 may be shaped to accommodate any type of hitch receiver 37. The hitch receiver 37 may include an inner portion 66. The inner portion 66 may be of any appropriate shape or size, such as a curved or rounded shape, for example.

The insert portion 40 may also include a cavity 60. The cavity may be positioned at any appropriate location within the insert portion 40. The cavity 60 may be of any appropriate shape or size, such as a cylindrical shape, for example. As shown in FIG. 1B, the body 20 may also be provided with a flange member 50. The flange member 50 may be of any appropriate shape or size. The flange member 50 may be adapted to rest on the hitch receiver 37. The insert portion 40 may also include apertures 65. The apertures 65 may be located through the insert portion 40. The apertures 65 may be of any appropriate shape or size, such as a cylindrical shape, for example. The apertures 65 may also be positioned at any appropriate location on the insert portion 40.

The interchangeable hitch ball assembly 10 may also include a passageway 55. The passageway 55 may be of any appropriate shape or size, such as a cylindrical shape, for example. The passageway 55 may extend through the ball member 15 and body 20 into the cavity 60 within the insert portion 40.

The assembly 10 may also include a plunger 27. The plunger may be located within the cavity 60 of the insert portion 40. The plunger 27 may be of any appropriate shape or size. The assembly 10 may also include an elongated member 25. The elongated member 25 may be of any appropriate shape or size, such as a generally cylindrical shape, for example. The assembly 10 may further include a locking member 35. It is to be understood that the locking members 35 may be of any appropriate shape or size. The elongated member 25 may include a first end 71 and a second end 70. The first end 71 may be connected to the plunger 27.

Figure 1F:
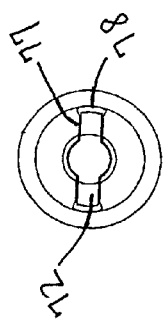
FIG. 1F illustrates a top view of the hitch ball assembly of FIG. 1B.
Figure 1C:
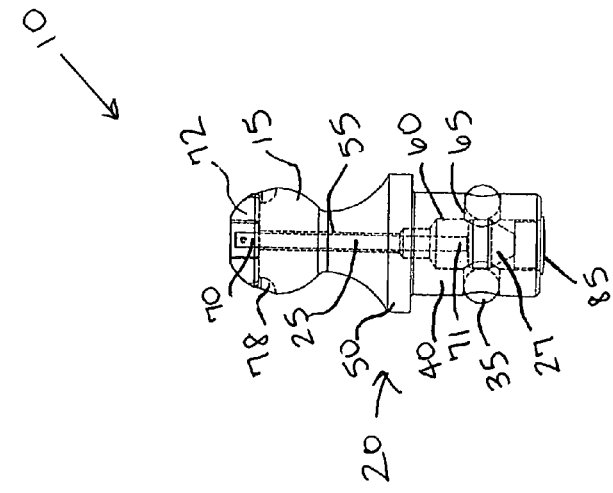
FIG. 1C illustrates a side view of the hitch ball assembly of FIG. 1B.

As best shown in FIGS. 1A and 1F, the assembly 10 may also include a head or handle 72. The head 72 may be provided to allow a user to selectively adjust the interchangeable hitch ball assembly 10 between the locked and unlocked positions. The head 72 may be attached to a second end 70 of the elongated member 25 by any appropriate means, such as with adhesives or a fastener, such as a roll pin 75, for example.

The ball member 15 may also include a recess 77 and an upper surface 92. The recess 77 may be provided in the ball member 15 so that when the assembly 10 is in the locked position, the head 72 may be flush with (or positioned below) the upper surface 92 of the ball member 15. It is to be understood that the configuration of the biasing member 30, as described above, may urge the handle 72 into the recess 77. Such a configuration may ensure that while the assembly 10 is in the locked position the head 72 does not interfere with the connection to the socket of a trailer. The ball member 10 may also include additional grooves 78 to facilitate easy access to the handle or head 72.

The assembly 10 may also include a cap 85. The cap 85 may be provided at the end of the cavity 60 to protect the elongated member 25, biasing member 30, and plunger 27 from dirt, dust, and other environmental elements. The cap 85 may be held in place by any appropriate means, such as by a snap or locking ring (not shown). The cap 85 may be of any appropriate shape or size, such as a generally cylindrical shape, for example. The cap 85 may be made from any appropriate material, such as plastic, metal, composites, and the like. In this manner, when the assembly 10 is removed from the vehicle, all the components that could be corroded or affected by environmental conditions can be retained in a dry and secure condition for storage and out of contact with the elements.

In an alternative embodiment, FIGS. 2A-2C illustrate an interchangeable hitch ball assembly 10 utilizing a biasing member 30. The body 20 may include a lip 82 located above the cavity 60. The biasing member 30 may be of any appropriate type of biasing means, such as a spring, for example. The biasing member 30 may be positioned along the elongated member 25 between the plunger 27 and the lip 82 of the body 20 to bias the plunger 27 toward the locking members 35.

The passageway 55 and cavity 60 may allow the elongated member 25 and the plunger 27 to be selectively engaged with one or more locking members 35, such as a ball bearing, for example, between a locked position (FIG. 2A) and a released or unlocked position (FIG. 2B). The interaction between the plunger 27 and locking members 35 is described in greater detail below.

In the locked position, as shown in FIG. 2A, the plunger 27 may engage the locking members 35 to push the locking members 35 outwardly beyond the insert portion 40 via the apertures 65. In turn, the locking members 35 may engage, for example, the inner portion 66 of the hitch receiver 37 to prevent the assembly 10 from being removed from the hitch receiver 37. Such a configuration may ensure that the assembly 10 remains in the locked position (FIG. 2A) to prevent disconnection from the hitch receiver 37 while towing.

In the released or unlocked position, as shown in FIG. 2B, the head 72 may be withdrawn upwardly from the recess 77 so that the plunger 27 may disengage from the locking members 35. Accordingly, the locking members 35 may disengage from the hitch receiver 37 and return toward the center of the insert portion 40. In the released position, the head 72 may protrude above the upper surface 92 of the ball member 15 to prevent a socket member (not shown) from being connected thereto.

As shown in FIG. 2B, a user may fix or maintain the interchangeable hitch ball assembly 10 in the open position by rotating the head 72 (for example, a ¼ turn) to retain the head 72 on the upper surface 92. This may free the user's hands to remove or insert the assembly 10 into the hitch receiver 37, and may also serve as an indicator that the assembly 10 is in the released position.

Figure 3B:
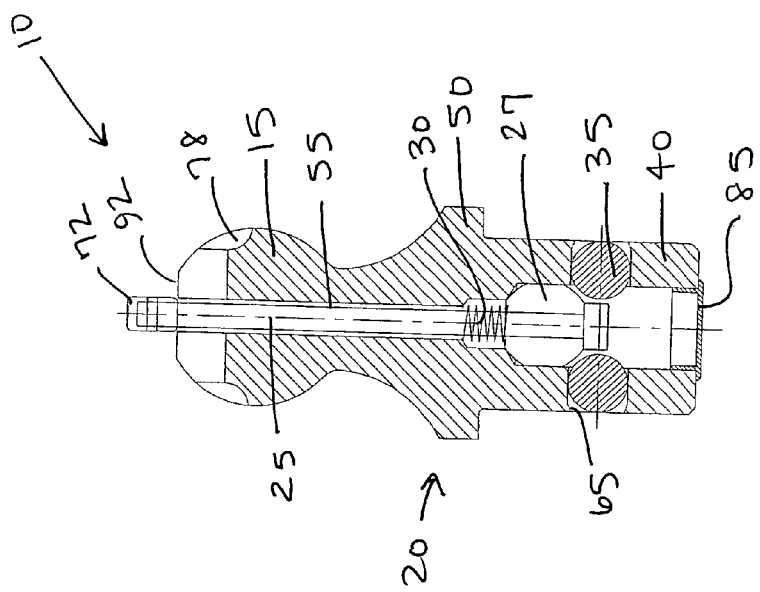
FIG. 3B illustrates a cross-sectional side view of the hitch ball assembly of FIG. 3A in an unlocked position.
Figure 3C:
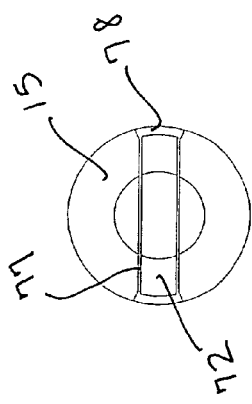
FIG. 3C illustrates a top view of the hitch ball assembly of FIG. 3A in a locked position.
Figure 3A:
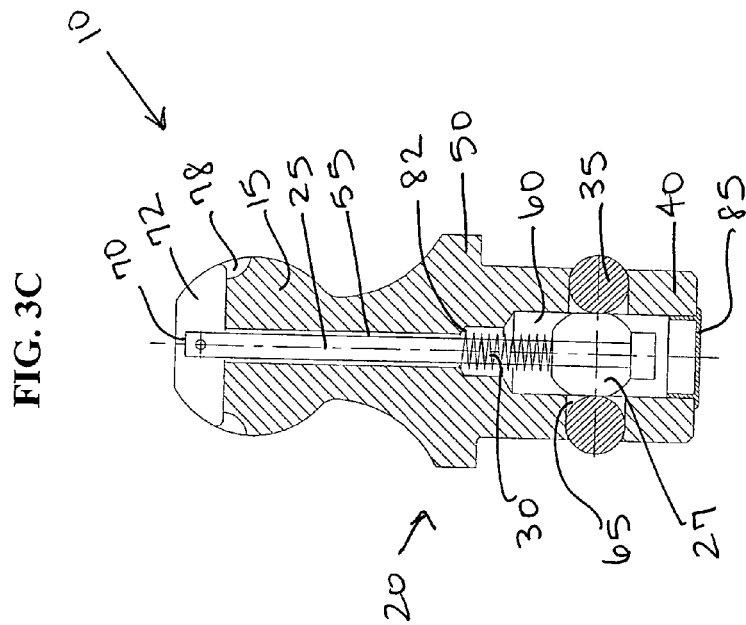
FIG. 3A illustrates a cross-sectional side view of an embodiment a hitch ball assembly in a locked position.

In an alternative embodiment, FIGS. 3A-3C illustrate an interchangeable hitch ball assembly 10 utilizing a different type of head 72. The head 72 may be of any appropriate shape or size, such as a wider rectangular shape. A wider or larger shape may provide the user an easier option for locking and unlocking the assembly.

Figure 4B:
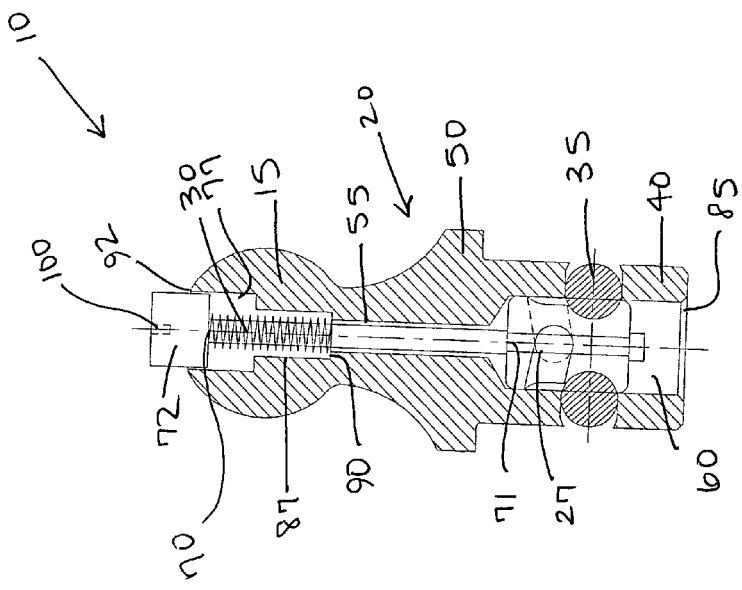
FIG. 4B illustrates a cross-sectional side view of the hitch ball assembly of FIG. 4A in an unlocked position.
Figure 4C:
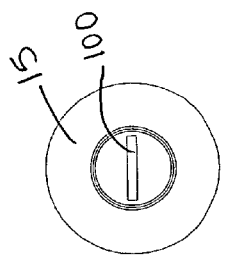
FIG. 4C illustrates a top view of the hitch ball assembly of FIG. 4A in a locked position.
Figure 4A:
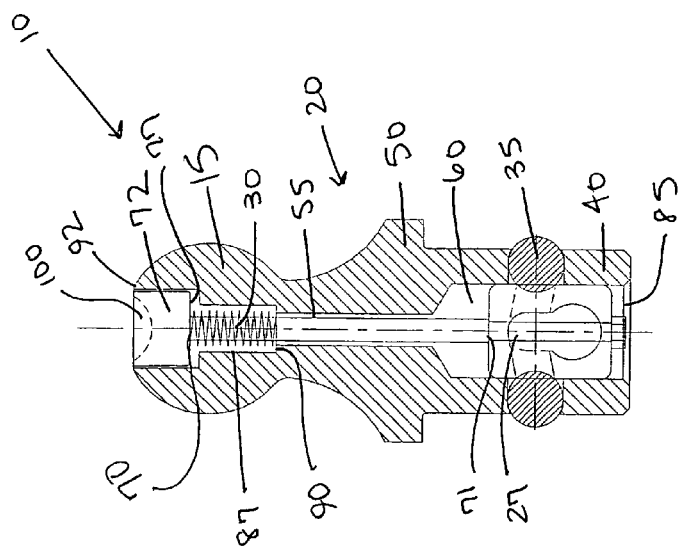
FIG. 4A illustrates a cross-sectional side view of an embodiment of a hitch ball assembly in a locked position.

In another alternative embodiment, FIGS. 4A-4C illustrate an interchangeable hitch ball assembly 10 utilizing a different location for and type of plunger 27. FIGS. 4A-4C also illustrate a different type of head 72. As shown in FIG. 4A, the biasing member 30 may be positioned along the elongated member 25 between the head 72 and a shoulder 90. In addition, the biasing member 30 may be located within an upper cavity 87.

As shown in FIG. 4A, the head 72 may be provided with a drive point 100, such as an indentation, for use with any appropriate type of tool, such as a screwdriver, for example. The assembly 10 may be adjusted to the locked position by applying pressure to the head 72 with a screwdriver to insert the head 72 in the recess 77. Accordingly, the plunger 27 may also be driven to engage the locking members 35. To maintain the assembly 10 in the locked position, the head 72 may then be rotated (for example, a ¼ turn) to secure the head 72 to the ball member 15 within the recess 77.

To return the interchangeable hitch ball assembly 10 to the released position, as shown in FIG. 4B, the head 72 may be rotated (for example, a ¼ turn) in the opposite direction. As the head 72 is released from the ball member 15, the biasing member 30 may drive the head 72 upwardly out of at least a portion of the recess 77 so that the plunger 27 disengages from the locking member 35. As the head 72 protrudes beyond the upper surface 92 of the ball member 15 in the released position, the head 72 may prevent a socket member from being connected.

As another alternative, as stated above, the head 72 may be provided with a locking mechanism, instead of a drive point 100. An object, such as a key or coin, may be inserted into the locking mechanism and pushed to drive the head 72 into the recess 77. The object may then be rotated to secure head 72 to the ball member 15 so that the assembly 10 remains in the locked position. Therefore, only users with the object may remove the assembly 10 from the hitch receiver 37.

Turning to the assembly 10, an example of a method of using the interchangeable hitch ball assembly 10 as illustrated in FIGS. 1A through 4C is set forth below. As indicated above, the interchangeable hitch ball assembly 10 may be removed from the hitch receiver 37 in a manner that does not require disconnection from the side or underneath of the vehicle. In order to connect and disconnect the assembly 10 from the vehicle, the head 72 may be withdrawn from the recess 77, as shown in FIGS. 2B, 3B, and 4B. To keep the assembly in the released position, the head 72 may be rotated so that the head 72 is retained on the upper surface 92. This may free the user's hands for insertion of the assembly 10 into the hitch receiver 37.

After insertion into the interchangeable hitch ball assembly 10, the head 72 may serve as a safety mechanism as it prevents a socket from being connected to the ball member 15 prior to the assembly 10 being secured to the hitch receiver 37. To place the assembly 10 in the locked position, the head 72 may be rotated to align with the recess 77 so that the biasing member 30 urges the plunger 27 to engage the locking members 35. In turn, the locking members 35 may engage the hitch receiver 37 so that the assembly 10 cannot be removed from the hitch receiver 37.

In order to remove the interchangeable hitch ball assembly 10 from the hitch receiver 37, the head 72 may be withdrawn from the recess 77 so that the assembly 10 may be received in the released or unlocked position as shown in FIGS. 2B, 3B, and 4B. Accordingly, the plunger member 27 may disengage from the securing members 35 so that the locking or securing members 35 are retracted toward the center of the insert portion 40, thereby allowing the assembly 10 to be removed from the hitch receiver 37.

The invention has been described above and, obviously, modifications and alternations will occur to others upon a reading and understanding of this specification. The claims as follows are intended to include all modifications and alterations insofar as they come within the scope of the claims or the equivalent thereof.

While the present invention is described with reference to embodiments described herein, the present invention is not limited to such embodiments. Therefore, the description of the embodiments herein is merely illustrative of the embodiments of the present invention and will not limit the scope of the invention as claimed. The invention has been described above and, obviously, modifications and alternations will occur to others upon a reading and understanding of this specification. The claims as follows are intended to include all modifications and alterations insofar as they come within the scope of the claims or the equivalent thereof.

Moreover, while the present interchangeable hitch ball assembly 10 may be described in the context of towing assemblies in association with a vehicle or trailer, however, it will be appreciated that the interchangeable hitch ball assembly 10 may be used in any variety of contexts, and, as such, any reference to towing assemblies or use with trailer and vehicles is illustrative in nature and not restrictive in any way. In addition, the description of the embodiments provided may refer to the use of specific options or materials, however, this should not limit the scope of the invention as claimed. Those skilled in the art will understand that the above descriptions should only be taken as illustrative.

Having thus described the invention, we claim:

1. A hitch ball assembly comprising:
   a ball member;
   a body connected to said ball member;
   a passageway;
   at least one locking member in communication with said passageway;
   a biasing member in communication with said passageway;
   an elongated member located within said passageway and biased toward said at least one locking member by said biasing member; and
   a plunger capable of being moved by said elongated member between a locked position wherein said plunger is moved toward said at least one locking member to force at least a portion of said at least one locking member outside of said body, and a release position wherein said plunger is moved away from said at least one locking member to allow said at least one locking member to retreat into said body.

2. The hitch ball assembly of claim 1 further comprising a head connected to said elongating member.

3. The hitch ball assembly of claim 2 further comprising a recessed portion in said ball member configured to prevent said head from rotating when said plunger is in said locked position.

4. The hitch ball assembly of claim 3, wherein said recessed portion is configured such that said head is flush with said ball member in said locked position.

5. The hitch ball assembly of claim 1, wherein said biasing member is a spring.

6. The hitch ball assembly of claim 5 further comprising a lip formed in said passageway to abut said spring.

7. The hitch ball assembly of claim 6, wherein said ball member and said body are integrally formed.

8. The hitch ball assembly of claim 7, wherein said at least one locking member is a ball bearing.

9. The hitch ball assembly of claim 8, wherein said at least one locking member is two locking members.

10. The hitch ball assembly of claim 9, wherein said head is secured to said elongating member by a pin.

11. The hitch ball assembly of claim 10, wherein said body includes a neck portion.

12. The hitch ball assembly of claim 11, wherein said body is configured to engage a hitch receiver such that said neck portion rests on top of the hitch receiver.

13. A hitch ball assembly comprising:
    a body;
    a ball member carried on said body;
    at least one locking element contained within said body;
    an elongated member positioned within said body, said elongated member having a first end connected to a head and a second end connected to a plunger;
    a biasing member configured to bias said plunger towards said at least one locking member to force at least a portion of said at least one locking member outside of said body; and
    wherein said plunger is capable of being moved away from said at least one locking member to allow said at least one locking member to retreat into said body.

14. The hitch ball assembly of claim 13, wherein said biasing member is a spring.

15. The hitch ball assembly of claim 14, wherein said ball member is integrally formed with said body.

16. The hitch ball assembly of claim 15, wherein said at least one locking member is two locking members.

17. The hitch ball assembly of claim 16, wherein said locking members are ball bearings.

18. The hitch ball assembly of claim 17 further comprising a recessed portion in said ball member configured to receive said head such that said head is flush with said ball member.

19. A hitch assembly comprising:
    a body;
    an elongated member positioned within said body;
    at least one locking member positioned in said body;
    a plunger engageable with said elongated member capable of moving said at least one locking member to a locked position wherein at least a portion of said at least one locking member is outside of said body; and
    a biasing member configured to bias said elongated member toward said locking position.

20. The hitch assembly of claim 19 further comprising a ball member carried on said body.

* * * * *